United States Patent
Hahn

(10) Patent No.: US 9,092,857 B2
(45) Date of Patent: Jul. 28, 2015

(54) METHOD FOR NOISE REDUCTION IN IMAGES IN AN IMAGE SEQUENCE

(75) Inventor: Burkhard Hahn, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 14/232,424

(22) PCT Filed: Sep. 7, 2012

(86) PCT No.: PCT/DE2012/100272
§ 371 (c)(1),
(2), (4) Date: Jan. 13, 2014

(87) PCT Pub. No.: WO2013/044907
PCT Pub. Date: Apr. 4, 2013

(65) Prior Publication Data
US 2014/0212063 A1     Jul. 31, 2014

(30) Foreign Application Priority Data
Sep. 29, 2011  (DE) .......................... 10 2011 054 056

(51) Int. Cl.
*G06K 9/40* (2006.01)
*G06T 5/00* (2006.01)

(52) U.S. Cl.
CPC ....... *G06T 5/002* (2013.01); *G06T 2207/10016* (2013.01); *G06T 2207/20182* (2013.01)

(58) Field of Classification Search
USPC .......... 382/264, 265, 260, 275, 131; 324/307, 324/332; 348/224.1, 731; 378/14, 210, 901; 360/67, 121; 600/437, 443, 440, 653
See application file for complete search history.

(56) References Cited

U.S. PATENT DOCUMENTS

| | | | |
|---|---|---|---|
| 3,889,108 A | | 6/1975 | Cantrell |
| 4,707,786 A | * | 11/1987 | Dehner ........................... 378/14 |
| 4,887,306 A | | 12/1989 | Hwang et al. |
| 5,495,846 A | | 3/1996 | Uehara et al. |
| 5,517,122 A | * | 5/1996 | Chen ............................. 324/322 |
| 5,749,926 A | * | 5/1998 | Dilling et al. ..................... 8/524 |
| 6,314,160 B1 | | 11/2001 | Dhawale et al. |
| 6,322,505 B1 | * | 11/2001 | Hossack et al. ............... 600/437 |
| 6,970,605 B1 | | 11/2005 | Kondo et al. |
| 8,537,285 B2 | * | 9/2013 | Silver et al. ................... 348/731 |

FOREIGN PATENT DOCUMENTS

DE       44 17 628 C1   9/1995
JP       2006 157228 A   6/2006

OTHER PUBLICATIONS de Haan et al "Automatic 2-D and 3-D noise filtering for high-quality television receivers"; Signal Processing of HDTV, VI. Proceedings of the International Workshop on HDTV '94; Jan. 1, 1995, pp. 221-230; XP055047483; ISBN: 978-0-44-482283-3.
Til Aach et al: "Noise Reduction and Image Enhancement Algorithms for Low-Dose X-Ray Fluoroscopy"; Jan. 1, 1996, XP055047487.

* cited by examiner

*Primary Examiner* — Anh Do
(74) *Attorney, Agent, or Firm* — Muncy, Geissler, Olds & Lowe, P.C.

(57) ABSTRACT

A method for noise suppression in images of an image sequence, where an iteratively better adapted noise suppression can be ensured for images of the image sequence, in particular in a rising number of images in the image sequence. The method for noise suppression includes a low-pass filter algorithm:

$$p_{i,j}^{n+1} = \alpha_{i,j}^{n+1} * p_{i,j}^{n} + (1-\alpha_{i,j}^{n+1}) * Q_{i,j}^{n+1}$$

with an attenuation function $\alpha_{i,j}^{n+1} = \alpha_{i,j}^{n+1}(\alpha 0_{i,j}^{n+1}, \Gamma_{i,j}^{n+1})$.

2 Claims, 2 Drawing Sheets

Perform a weighting of the attenuation factor $\alpha 0_{i,j}^{n+1}$ as a function of the movement measure $\Gamma_{i,j}^{n+a}$

METHOD FOR NOISE REDUCTION IN IMAGES IN AN IMAGE SEQUENCE

This application is a national stage of International Application No.: PCT/DE2012/100272, which was filed on Sep. 7, 2012, and which claims priority to DE 10 2011 054 056.3 which was filed on Sep. 29, 2011, and which are both herein incorporated by reference.

BACKGROUND OF THE INVENTION

1. Field of the Invention

The invention relates to a method for noise suppression in images of an image sequence.

2. Description of the Background Art

It is known in the field of digital image processing that characteristic picture disturbances occur in accordance with the properties of the sensors used for image acquisition. Digital images recorded under unfavorable lighting conditions or having a high proportion of dark image areas exhibit a relatively high noise level. Filtering methods which improve the signal-to-noise ratio are generally used in order to reduce the dominating photon noise present in the images. As a rule, for this purpose a time filter is applied to the regions of the images in which no movement is present. A detection of moved image contents is carried out on the basis of the change in intensity determined for each separately considered pixel. It is assumed that a pixel is in movement when the fluctuation in intensity between images of a sequence overshoots a threshold value which is directly related to the standard deviation of the noise. These pixels determined as being in motion are not filtered, or are filtered only slightly. Processing with a rigid recursive time filter as described in patent U.S. Pat. No. 6,314,160 B1, is applied to the pixels determined as static or immobile. The use of a recursive low-pass as a filter base limits the maximum averaging length over an image sequence. The method therefore has a limited quality of noise suppression and a slow transient response.

SUMMARY OF THE INVENTION

It is an object of the invention to find how an iteratively better adapted noise suppression can be ensured for images of an image sequence, in particular given a rising number of images.

This object is achieved according to the invention by a method for noise suppression which provides a low-pass filter algorithm:

$$P_{i,j}^{n+1} = \alpha_{i,j}^{n+1} * P_{i,j}^n + (1 - \alpha_{i,j}^{n+1}) * Q_{i,j}^{n+1}$$

with an attenuation function $\alpha_{i,j}^{n+1} = \alpha_{i,j}^{n+1}(\alpha 0_{i,j}^{n+1}, \Gamma_{i,j}^{n+1})$. For each pixel, the attenuation function $\alpha_{i,j}^{n+1}$ is dependent, firstly, on an attenuation factor $\alpha 0_{i,j}^{n+1}$ and, secondly, on a movement measure $\Gamma_{i,j}^{n+1}$. The movement measure $\Gamma_{i,j}^{n+1}$ is dependent on a grayscale value difference $dQ_{i,j}^{n+1} = |P_{i,j}^n - Q_{i,j}^{n+1}|$ between filtered and unfiltered pixel, a prescribable difference threshold dif_swl, and on an amplitude of the grayscale value $Q_{i,j}^{n+1}$ of the pixel.

The attenuation factor $\alpha 0_{i,j}^{n+1}$ is adapted to the duration of the immobility $\Gamma_{i,j}^{n+1} \approx 0$ of the grayscale value of a pixel. Furthermore, a lower limiting value $\alpha 0_{min}$ and an upper limiting value $\alpha 0_{max}$ are defined for the attenuation factor $\alpha 0_{i,j}^{n+1}$. In addition, the recursive filtering of unmoved pixels ($\Gamma_{i,j}^{n+1} \approx 0$) has an attenuation factor approaching $\alpha 0_{max}$, and the recursive filtering of moved pixels ($\Gamma_{i,j}^{n+1} \approx 1$) with high grayscale value dynamics has an attenuation factor approaching $\alpha 0_{min}$.

BRIEF DESCRIPTION OF THE DRAWINGS

The invention is to be explained in more detail below with the aid of exemplary embodiments and the accompanying drawings which are given by way odf illustration only, wherein.

DETAILED DESCRIPTION

Figure 1:
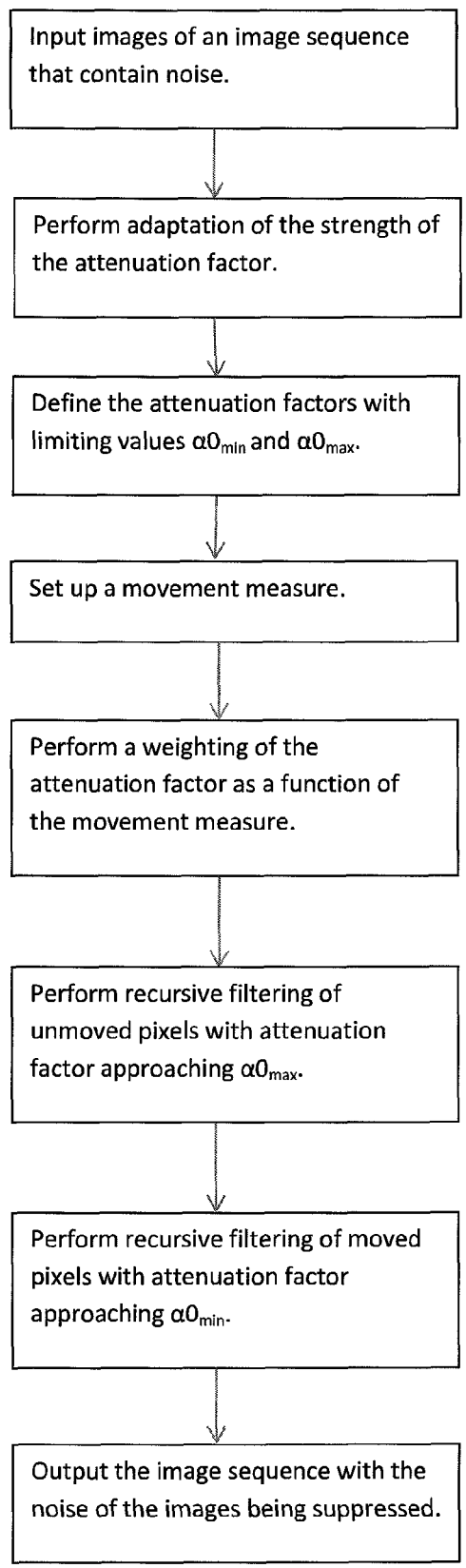
FIG. 1 is a flowchart of an exempaly method of the invention.

In one variant of the method, a filter algorithm with a recursive averaging is applied to each pixel of an image from a sequence. The low-pass filter used for this purpose acts iteratively with an attenuation function $\alpha_{i,j}^{n+1}$, adapted for the pixel, on the grayscale value difference $dQ_{i,j}^{n+1}$ from the grayscale value $Q_{i,j}^{n+1}$ of the pixel of a currently recorded image and the grayscale value $P_{i,j}^n$ of the pixel of a previously recorded and already filtered image. The attenuation function acts in dependence on an attenuation factor $\alpha 0_{i,j}^{n+1}$ adapted for the pixel, and the movement measure $\Gamma_{i,j}^{n+1}$. The value of the movement measure $\Gamma_{i,j}^{n+1}$ is governed by the grayscale value difference $dQ_{i,j}^{n+1}$ and is influenced by a threshold value dif_swl to be prescribed, and a weighting factor $\gamma_{i,j}^{n+1}$. This weighting factor $\gamma_{i,j}^{n+1}$ is dependent on the grayscale value $\alpha Q_{i,j}^{n+1}$ and a reference grayscale value Q0. The adaptation of the attenuation factor $\alpha 0_{i,j}^{n+1}$ is likewise performed as a function of the movement measure $\Gamma_{i,j}^{n+1}$ and the value of the already iterativeiy adapted attenuation factor $\alpha 0_{i,j}^n$, which was used to filter the previous image.

The invention is based on the finding that moved image contents can be detected when the grayscale value of the dynamic image contents stands out from the grayscale value of the static image contents. The difference thus produced is therefore higher than the difference which occurs between noisy pixels in a static image section. This distinction can be used to process dynamic image contents with a different noise suppression than the static ones. The inventive filter algorithm can be used for iterativeiy amplifying the attenuating filter action in noisy, static image areas and reducing it in dynamic image areas or for admitting no attenuation at all.

The decision as to whether a pixel is to be classified as dynamic or static is performed using the movement measure $\Gamma_{i,j}^{n+1}$. It is defined by:

$$\Gamma_{i,j}^{n+1} \begin{cases} = \dfrac{dQ_{i,j}^{n+1}}{\text{dif\_swl}} * \gamma_{i,j}^{n+1} & [\text{for } dQ_{i,j}^{n+1} * \gamma_{i,j}^{n+1} < \text{dif\_swl}] \\ = 1 & [\text{otherwise}] \end{cases}$$

The threshold value dif_swl and the weighting factor $\gamma_{i,j}^{n+1}$ are used to weight the grayscale value difference $dQ_{i,j}^{n+1}$. The threshold value dif_swl is prescribed, and the weighting factor $\gamma_{i,j}^{n+1}$ is calculated as follows:

$$\gamma_{i,j}^{n+1} \begin{cases} = \sqrt{\dfrac{Q0}{Q_{i,j}^{n+1}}} & [\text{for } Q_{i,j}^{n+1} > Q0] \\ = 1 & [\text{for otherwise}] \end{cases}$$

The noise of a pixel is dependent on the signal strength of its grayscale value. Lighter pixels have a stronger noise performance than darker ones do. Consequently, the brightness of the grayscale value of a pixel is taken into account by the use of the reference grayscale value Q0. An advantageous value of Q0 is at 30% of the maximum grayscale value $GW_{max}$. The threshold value dif_swl can assume values between 0 and $GW_{max}$, and determines the separation between moved and unmoved pixels. The value of this threshold value dif_swl therefore influences the strength of the edge smearing on moved image contents.

The attenuation function $\alpha_{i,j}^{n+1}$ is dependent substantially on the grayscale value difference $dQ_{i,j}^{n+1}$, the signal strength $Q_{i,j}^{n+1}$ and the attenuation factor $\alpha 0_{i,j}^{n+1}$:

$$\alpha_{i,j}^{n+1} = \alpha 0_{i,j}^{n+1} * (1 - \Gamma_{i,j}^{n+1}),$$

$$\text{where: } \Gamma_{i,j}^{n+1} \begin{cases} = \dfrac{d\tilde{Q}_{i,j}^{n+1}}{\text{dif\_swl}} & [\text{for } d\tilde{Q}_{i,j}^{n+1} < \text{dif\_swl}] \\ = 1 & [\text{for otherwise}] \end{cases}$$

$$\text{where: } d\tilde{Q}_{i,j}^{n+1} = dQ_{i,j}^{n+1} * \gamma_{i,j}^{n+1}$$

An iterative adaptation of the attenuation factor $\alpha 0_{i,j}^{n+1}$ in the direction of a stronger attenuation effect over the duration of the immobility $P_{i,j}^{n+1} \approx P_{i,j}^{n}$ of a pixel $Q_{i,j}^{n+1}$ leads to an improved noise suppression. In the case of unmoved pixels, an advantageous adaptation of the attenuation factor is given by the following sequence:

$$\alpha 0 = \{1/2, 2/3, 3/4, 4/5, 5/6, 6/7, \ldots\}$$

Given lasting immobility, the attenuation factor $\alpha 0_{i,j}^{n+1}$ is increased iteratively, and so it approaches the value 1, and the attenuation function $\alpha_{i,j}^{n+1}$ therefore enables a maximum noise suppression at this pixel.

Figure 2:
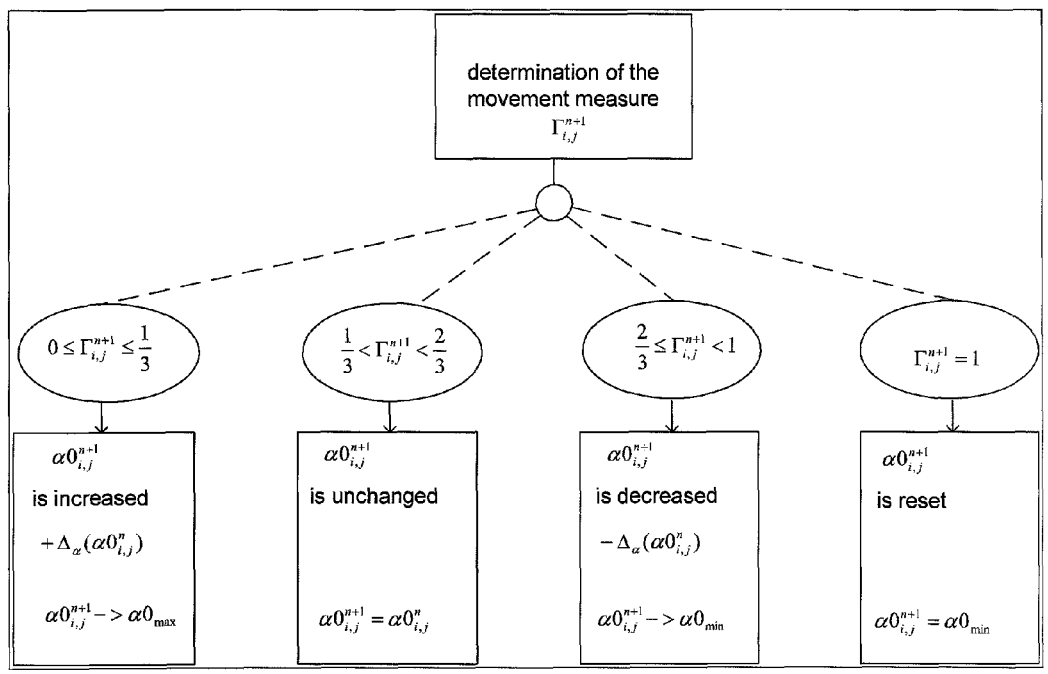
FIG. 2 is a chart of the weighting of the attenuation factor according to an exemplary embodiment of the invention.

The attenuation factor $\alpha 0_{i,j}^{n+1}$ is therefore dependent on the attenuation factor $\alpha 0_{i,j}^{n}$, which was used to filter the pixel of the previous image, and on the movement measure $\Gamma_{i,j}^{n+1}$ of a pixel of the current image. It is evident that the attenuation factor $\alpha 0_{i,j}^{n+1}$ is increased for a small movement measure $\Gamma_{i,j}^{n+1}$, and reduced for a large movement measure $\Gamma_{i,j}^{n+1}$. This is performed within the prescribed limiting values $\alpha 0_{min}$ and $\alpha 0_{max}$. An advantageous implementation of this adaptation can be performed in this defined subdivision (also see FIG. 2):

$$\alpha 0_{i,j}^{n+1} \begin{cases} = \alpha 0_{i,j}^{n} + \Delta_\alpha & [\text{for } 0 \leq \Gamma_{i,j}^{n+1} \leq 1/3] \\ = \alpha 0_{i,j}^{n} & [\text{for } 1/3 \leq \Gamma_{i,j}^{n+1} \leq 2/3] \\ = \alpha 0_{i,j}^{n} - \Delta_\alpha & [\text{for } 2/3 \leq \Gamma_{i,j}^{n+1} < 1] \\ = \alpha 0_{min} & [\text{for } \Gamma_{i,j}^{n+1} = 1.0] \end{cases}$$

The following adaptation resulting from threshold value overshooting:

$$\alpha 0_{i,j}^{n+1} \begin{cases} = \alpha 0_{min} & [\text{for } \alpha_{i,j}^{n+1} < \alpha 0_{min}] \\ = \alpha 0_{max} & [\text{for } \alpha_{i,j}^{n+1} > \alpha 0_{max}] \\ = \alpha 0_{i,j}^{n+1} & [\text{for otherwise}]. \end{cases}$$

If a pixel is classified as not moved or as noisy, the attenuation factor from the preceding filter pass is increased by the absolute value $\Delta_\alpha$, and so the attenuation is increased. In the case of a pixel classified only as moderately moved, the attenuation factor $\alpha 0_{i,j}^{n+1}$ is adopted without change. If the pixel is classified as moved, the damping factor $\alpha 0_{i,j}^{n}$ from the previous filter pass is attenuated by the absolute value $\Delta_\alpha$. A pixel classified as strong in movement resets the filter strength of the attenuation factor $\alpha 0_{i,j}^{n+1}$ to the lower limiting value $\alpha 0_{min}$, as a result of which only very slight attenuation, or no further attenuation takes place at this pixel.

If the adaptation of the attenuation factor $\alpha 0_{i,j}^{n+1}$ is to be done yet more variably and exactly, it is advantageous to store a more comprehensive differentiating subdivision of ranges in a look-up table.

Symbols $\alpha 0$—sequence of attenuation factors
$\alpha 0_{max}/\alpha 0_{min}$—upper/lower limiting value of the attenuation factor
$\alpha 0_{i,j}^{n+1}$—attenuation factor adapted to pixel
$\alpha 0_{i,j}^{n}$—attenuation factor of the predecessor
$\alpha_{i,j}^{n+1}$—attenuation function adapted to the pixel
$\alpha_{i,j}^{n}$—attenuation function that was applied to the predecessor
$\Delta_\alpha$—absolute value of the change in the attenuation factor
Q0—reference grayscale value
$GW_{max}$—maximum grayscale value
$Q_{i,j}^{n+1}$—grayscale value of the current pixel
$dQ_{i,j}^{n+1}$—grayscale value difference from $P_{i,j}^{n}$ and $Q_{i,j}^{n+1}$
$P_{i,j}^{n+1}$—grayscale value of the current pixel after filtering
$P_{i,j}^{n}$—grayscale value of the preceding pixel after filtering
dif_swl—threshold value for movement measure
$\gamma_{i,j}^{n+1}$—weighting factor (grayscale value)
$\Gamma_{i,j}^{n+1}$—movement measure

The invention claimed is:

1. A method for noise suppression in images of an image sequence in accordance with the following algorithm:

$$p_{i,j}^{n+1} = \alpha_{i,j}^{n+1} * p_{i,j}^{n} + (1-\alpha_{i,j}^{n+1}) * Q_{i,j}^{n+1}$$

where: $p_{i,j}^{n+1}$ = grayscale value of a pixel of the ith row and the jth column after the (n+1)th iteration,
$p_{i,j}^{n}$ = grayscale value of a pixel of the ith row and the jth column after the (n)th iteration,
$Q_{i,j}^{n+1}$ = grayscale value of a pixel of the ith row and the jth column after the (n+1)th recording (unfiltered), and
$\alpha_{i,j}^{n+1}$ = attenuation function for a pixel in the ith row and the jth column,
the algorithm being a recursive low-pass filter with an attenuation function $\alpha_{i,j}^{n+1}$ adapted for the pixel, and the action of the attenuation being dependent on a grayscale value difference $dQ_{i,j}^{n+1} = |P_{i,j}^{n} - Q_{i,j}^{n+1}|$ between filtered and unfiltered pixels, on an amplitude of the grayscale value $Q_{i,j}^{n+1}$ of the pixel, the method further including the following equation:

$$\gamma_{i,j}^{n+1} \begin{cases} = \sqrt{\dfrac{Q0}{Q_{i,j}^{n+1}}} & [\text{for } Q_{i,j}^{n+1} > Q0] \\ = 1 & [\text{for otherwise}] \end{cases}$$

where $\gamma_{i,j}^{n+1}$ = weighting factor, and
Q0 = reference grayscale value,
the method including:
inputting images of an image sequence that contain noise,
performing an adaptation of the strength of the attenuation factor $\alpha 0_{i,j}^{n+1}$ taking account of the sequence length in which a pixel of the ith row and the jth column has an unchanged grayscale value, defining the attenuation factors $\alpha 0_{i,j}^{n+1}$ with a limiting value $\alpha 0_{min}$ and a limiting value $\alpha 0_{max}$,
setting up a movement measure as follows:

$$\Gamma_{i,j}^{n+1} \begin{cases} = \dfrac{dQ_{i,j}^{n+1}}{\text{dif\_swl}} * \gamma_{i,j}^{n+1} & [\text{for } dQ_{i,j}^{n+1} * \gamma_{i,j}^{n+1} < \text{dif\_swl}] \\ = 1 & [\text{otherwise}] \end{cases}$$

the movement measure being a function of a threshold value dif_swl and the movement measure determining whether the pixel is classified as dynamic or static,
the method further including the following equation:

$$\alpha_{i,j}^{n+1} = \alpha 0_{i,j}^{n+1} * (1 - \Gamma_{i,j}^{n+1})$$

such that the method further comprises,
performing a weighting of the attenuation factor $\alpha 0_{i,j}^{n+1}$ as a function of the movement measure $\Gamma_{i,j}^{n+1}$,
performing the recursive filtering of unmoved pixels with an attenuation factor $\alpha 0_{i,j}^{n+1}$ approaching $\alpha 0_{max}$ to suppress the noise,
performing the recursive filtering of moved pixels with an attenuation factor $\alpha 0_{i,j}^{n+1}$ approaching $\alpha 0_{min}$ to suppress the noise, and
outputting the image sequence with the noise of the images being suppressed.

2. The method according to claim 1, wherein, when the pixel is determined to be static, such that $0 \leq \Gamma_{i,j}^{n+1} \leq 1/3$, the attenuation factor $\alpha 0_{i,j}^{n+1}$ from a preceding filter pass is increased by a value $\Delta_\alpha$, such that attenuation is increased, wherein, when the pixel is determined to be dynamic, such that $2/3 \leq \Gamma_{i,j}^{n+1} < 1$, the attenuation factor $\alpha 0_{i,j}^{n+1}$ from the preceding filter pass is decreased by the value $\Delta_\alpha$, wherein, when the pixel is determined to be dynamic, such that $1/3 \leq \Gamma_{i,j}^{n+1} \leq 2/3$, the attenuation factor $\alpha 0_{i,j}^{n+1}$ is not changed, and wherein, when the pixel is determined to be dynamic, such that $\Gamma_{i,j}^{n+1} = 1.0$, the attenuation factor $\alpha 0_{i,j}^{n+1}$ is reset to the limiting value $\alpha 0_{min}$.

* * * * *